United States Patent [19]

Garofalo, Jr. et al.

[11] 4,044,331
[45] Aug. 23, 1977

[54] DATA INPUT APPARATUS HAVING BIDIRECTIONAL READER FOR INPUTTING ALTERNATIVE MESSAGES

[75] Inventors: Frank John Garofalo, Jr., Woodstock; George Nathan Pardonner, Jr., Saugerties, both of N.Y.

[73] Assignee: International Business Machines Corporation, Armonk, N.Y.

[21] Appl. No.: 379,691

[22] Filed: July 16, 1973

[51] Int. Cl.² .................. G06F 11/00; G06K 9/18; G06K 19/06; H04Q 9/00
[52] U.S. Cl. ...................... 364/900; 235/61.7 B; 340/149 R
[58] Field of Search .............. 340/172.5, 146.3 K, 340/149 A, 149 R; 235/61.11 E, 61.11 D, 61.7 B; 179/2 DP

[56] References Cited

U.S. PATENT DOCUMENTS

| | | | |
|---|---|---|---|
| 3,307,147 | 2/1967 | Goldman et al. | 340/150 |
| 3,408,483 | 10/1968 | Zuse | 235/61.11 D |
| 3,516,068 | 6/1970 | Howard et al. | 340/172.5 |
| 3,576,433 | 4/1971 | Lee et al. | 340/172.5 X |
| 3,579,196 | 5/1971 | Gregg, Jr. et al. | 340/172.5 |
| 3,598,964 | 8/1971 | Dell et al. | 235/61.11 E X |
| 3,617,638 | 11/1971 | Winchester et al. | 235/61.7 B |
| 3,632,995 | 1/1972 | Wilson | 235/61.11 |
| 3,662,342 | 5/1972 | Hedin et al. | 340/149 R |
| 3,671,718 | 6/1972 | Genzel et al. | 235/61.11 E |
| 3,671,722 | 6/1972 | Christie | 235/61.11 E X |
| 3,697,693 | 10/1972 | Deschenes et al. | 179/2 DP |
| 3,717,750 | 2/1973 | Gilberg et al. | 235/61.11 E |
| 3,718,764 | 2/1973 | Deschenes et al. | 179/2 DP |
| 3,732,542 | 5/1973 | Hedin | 340/149 A |
| 3,778,597 | 12/1973 | Vanderpool et al. | 235/61.11 E |
| 3,792,236 | 2/1974 | Dobras et al. | 235/61.11 E |
| 3,798,421 | 3/1974 | Gilberg et al. | 235/61.11 E |
| 3,803,634 | 4/1974 | Namikawa | 235/61.11 D X |
| 3,838,395 | 9/1974 | Suttill, Jr. et al. | 340/149 A |
| 3,882,301 | 5/1975 | Nassimbene | 235/61.11 E |

OTHER PUBLICATIONS

IBM Technical Disclosure Bulletin, vol. 15, No. 10, Mar. 1973, pp. 3156-3159, Hand Fed Card Reader by Hobbs and Miller.

*Primary Examiner*—Melvin B. Chapnick
*Attorney, Agent, or Firm*—Frederick D. Poag

[57] ABSTRACT

A data entry system suitable for entry/exit (attendance) recording includes a terminal unit having identity card reading means, adapted to be connected via an extension line to a central apparatus such as a computer controlled telephone line switching system having data handling capabilities. The terminal unit includes a buffer to store the data read from the identity card prior to requesting service from the line switching system and includes a locally generated signal to indicate that the card was correctly read and means responsive to a signal from the central system to indicate that the data was accepted. The card forms a component of the system and is encoded in such fashion that the manner of its use indicates whether entry or exit information is being recorded, and the terminal unit is responsive to the information entered by the card and the response of the central system to provide appropriate logical output at the terminal, such as the activation of an automatic door lock.

8 Claims, 4 Drawing Figures

DATA INPUT APPARATUS HAVING BIDIRECTIONAL READER FOR INPUTTING ALTERNATIVE MESSAGES

CROSS REFERENCE TO RELATED APPLICATION

Application Ser. No. 379,690 (now U.S. Pat. No. 3,913,071) by Frank J. Garofalo, Jr., filed on even date herewith, is a related application.

FIELD OF THE INVENTION

This invention relates to data entry apparatus, and more particularly to a card reading terminal for use in a system including a central data handling apparatus, wherein the terminal has data analyzing, buffering and response capabilities.

BACKGROUND OF THE INVENTION

In the prior art of attendance recorders, time clocks have been employed wherein the user removes a card from a rack, inserts it into the time clock for imprinting, and then returns it to the rack. Such time cards may have "In" and "Out" positions for such imprinting and the clock mechanism may have a carriage for receiving the card, which carriage is positioned by the clock at In and Out positions according to the time of the day. Where the user is actually going out at an In time, it may be possible for the user to override this mechanism to indicate that fact when imprinting the card. There is no guarantee that the user utilizes the correct card or is an unauthorized person for entry or exit, and there is no automatic reporting of the entry and exit to a central system.

The prior art also includes data gathering systems wherein there is a central system connected by wire to remote terminals. Such remote terminals may include card reading apparatus, for example, for reading a job ticket, and keyboard apparatus for entering information coordinate with the information read by the terminal from the card. Ordinarily, devices of this kind are not intended for rapid use by one person after another, as is the case of an attendance recorder, and may lack such features desirable in an attendance recorder as differentiation between entry and exit and provision of a logical output at the terminal.

SUMMARY OF THE INVENTION

According to one aspect of the invention, a system is provided comprising a terminal having means to read an identity card, such as a hand-held magnetic stripe card, and means responsive to a "good" read to activate a local signal indicating to the user that the terminal has accepted the data.

According to another aspect of the invention the card employed by the user is encoded in such fashion, that the manner of its use is indicative of one or another of classes of information. For example, the information encoded on the card may identify the user and the manner of use of the card may identify whether the user is entering or exiting. In accordance with still another aspect of the invention, the card is a magnetic stripe card having but a single stripe which includes identity information and the mirror image of that identity information so that the card can be passed through the reading mechanism in either direction to properly input the information.

In accordance with the preferred embodiment of the invention, the first data field and its mirror image differ and only one field or the other is read, according to the direction of passage through the read apparatus whereby the central system may be informed of whether an entry or an exit was recorded. In accordance with still another aspect of the invention a logical output, such as a signal for activating a door lock, for example, is produced by the terminal apparatus upon the reading of information of a specified category, such as an "entry" reading of an identity number, followed by an acceptance by the central system.

Accordingly, it is an object of the invention to provide an improved terminal device for entry of data into a central system.

It is another object of the invention to provide a terminal device as aforesaid having means giving prompt and easily understood indication that the data has been read and accepted.

It is another object of the invention to provide an improved terminal as aforesaid including means automatically discriminating between information of different categories, such as recording of entry versus exit information in an attendance recorder employment.

Still another object of the invention is to provide an improved terminal apparatus as aforesaid including means to provide a logical output locally upon certain conditions, such as a entry and acceptance of data of a first category as opposed to the entry and acceptance of data of another category.

The foregoing and other objects, features and advantages of the present invention will be apparent from the following description of a preferred embodiment of the invention as illustrated in the accompanying drawings.

DETAILED DESCRIPTION

Figure 1:
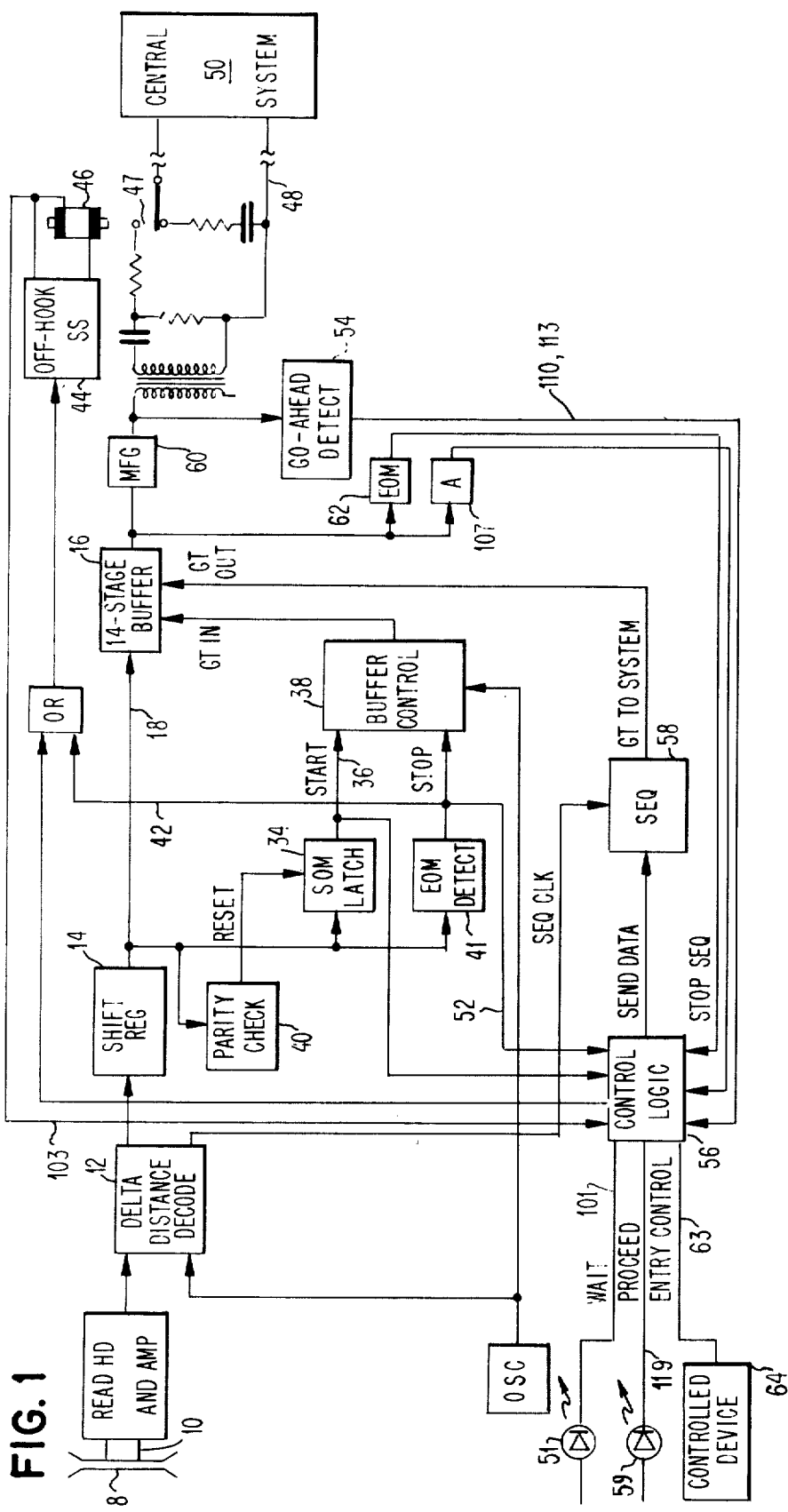
FIG. 1 is a schematic diagram of a terminal in accordance with the invention, employed in a system with which it is cooperative.
Figure 2:
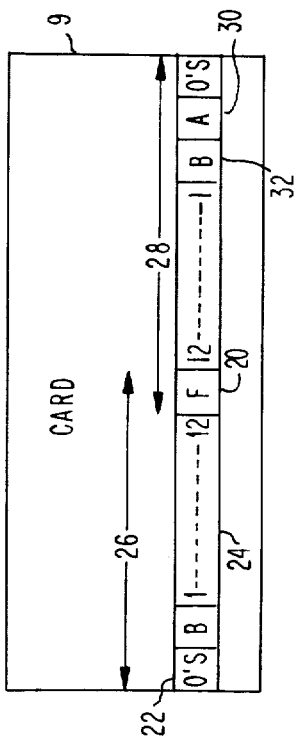
FIG. 2 is a representation of a magnetic stripe identity card suitable for use with the system of FIG. 1, showing diagramatically an encoding system on the card cooperative with aspects of the system of FIG. 1.

In the apparatus of FIG. 1, a slot 8 is provided through which a card 9 such as shown in FIG. 2 may be trained, the card being hand-held with the magnetic stripe thereof sliding along slot 8 past read head 10. The information read serially by head 10 is decoded at 12. Where, as in the preferred embodiment, the card is hand-held as is trained through slot 8, it is preferred that a coding scheme such as delta modulation which is independent of the speed of travel of the card be employed. In delta modulation, the binary significance of the bits (that is, whether they are one or zero) is determined by the length of a given bit compared to its predecessor. With a bit density of, for example, seventy-five bits per inch along the magnetic stripe, the speed of travel of even a hand-held card will not vary greatly between adjacent bit positions, and therefore, delta modulation provides a reliable coding scheme for use in an apparatus of the instant kind. On the other hand, it may be desirable that the system respond to identity cards coded in other schemes, such as, for example, the ABA code which utilizes F2F, NRZI code. In such case decoder 12 can be adapted to respond to an F2F code as if it were a delta modulation code, making appropriate truth table conversion. The form of the code and the details of the decoder 12 do not per se form any part of the present invention, and any suitable coding and decoding scheme can be utilized.

The usual magnetic stripe card is recorded serial by bit and therefore shift register 14 is provided to convert the data read into serial by character, parallel by bit form.

The data is conveyed as it is read, decoded and deserialized in real time to buffer 16 via connection 18. In the message format shown in FIG. 2, a message to be transmitted may consist of up to 14 characters, including data and control characters. The start-of-message character is used for control only and is not transmitted to the central system. Accordingly, buffer 16 consists preferrably of a 14 stage register array, and is capable of storing the complete message and those control characters which are to be transmitted to the central system.

Referring now more particularly to FIG. 2, the magnetic stripe 20 of a card 9 suitable for use in accordance with the preferred embodiment of the system may be encoded with a set of leading zero's 22 followed by the hexidecimal character B and then by up to 12 data characters 24 followed by the hexidecimal character F. The character B functions as a start-of-message character (SOM) and the character F functions as a end-of-message character (EOM). Accordingly, when the card is read from the left hand edge as seen in FIG. 2 only the left hand half of the magnetic stripe recorded information is of significance.

The right hand half of the magnetic stripe is recorded in a manner which is a mirror image of that which has been recorded on the left hand half except for inclusion of a control character 32 next to the SOM character 30. In recording the magnetic stripe a character in the left hand half 26 is recorded in conventional hexidecimal code but those in the right hand half 28 of the stripe are recorded in the mirror image of the hexidecimal code. Accordingly, when read backwards, that is, from the right hand edge toward the center, a conventional hexidecimal output is obtained. Since, with a parity bit added, the "hex" code for F is 11111, this character is read the same whether forward or backward and, therefore, the same character functions as an EOM for each half of the magnetic stripe. In the drawing, the B, 30 in the right hand half is shown as an A and a A, 32 is shown as a B to indicate the mirror image recording. That is, a hex B, with parity 01011, is the mirror image of a hex A, with parity 11010, and vice versa. Thus, when character 30 is read from right to left, that is backwards, it will be read as 01011, not 11010, and will be recognized as an SOM B, and character 32 will be read 11010, not 01011, and will be recognized as an A.

Returning to FIG. 1, the detection of SOM at 34 with good parity activates the start input 36 of buffer control 38 to initiate storage of characters as they are supplied from deserializer 14 to buffer 16 via 18. Buffer control 38 stores incoming characters to the last unoccupied register of buffer 16. If any character has incorrect parity, SOM 34 is reset by parity check unit 40 thereby terminating the data inputting operation. Otherwise, the characters are stored in order in buffer 16 until an EOM is detected by circuit 41 which stops the storage operation and, via line 42, starts off-hook single shot (monostable multivibrator 44). This causes the terminal to "go off-hook", that is, to signal the central system that service is desired. This signal is propagated to the extension by a relay 46 activated by the off-hook single shot 44 and having a normally open contact 47 in series with the extension loop 48 connecting the terminal to the central system 50. At this point, the terminal unit has accepted the data in its buffer 16 and "wait" light 51 is turned on in response to the EOM signal on line 52.

The central system responds with a go-ahead tone, analagous to a dial tone, which is detected by circuit 54. Any suitable detector can be employed; a band-pass filter followed by a rectifier is one simple example. Circuit 54 in turn activates control logic 56 to initiate sequencer 58 to gate data from buffer 16 to multifrequency generator 60 for transmission, in MF coded form, via the extension to the central system 50. The central system may be, for example, an IBM 3750 line switching system, generally of the kind described in IBM Journal of Research and Development, Volume 13, No. 4, pages 408-455. The system 50 and its appropriate programming do not form, per se, any part of the present invention.

Nevertheless, the terminal of the present invention is designed to cooperate with such a system in the sense that it yields appropriate off-hook signals and MFG inputs to the system, and it responds to dial tone-like responses from the system and interprets such responses as goahead and data accepted signals. This is a so-called "hot line" or non-dialed connection type of operation wherein the system 50 recognizes that the mere going off-hook of extension 48 means that that extension requires service of the kind to which it is dedicated, in this case, attendance recorder service.

Data is stepped from buffer 16 under the control of sequencer 58 until the end of message character is detected by EOM decoder 62 at the output of buffer 16. The output of EOM decoder 62 activates control logic 56 to stop, via sequencer 58, readout operation of buffer 16.

The use made by the central system 50 of the MF encoded information received by the system over the extension line 48 may vary according to the application. In a typical case the data sent to the system may include an identification number of the card user, and, as aforesaid, it may include an A character to indicate that an "entry" as opposed to "exit" report is being made. The system may then consult its files to determine whether the identity number is a valid one and may log the event for future reference. Typically, whether the reporting was of an entry or exit operation, the system responds with a simple short dial tone indicating that the data has been received and has been processed satisfactorily. This second dial tone is detected as before by go-ahead detector 54 and operates control logic 56 to drop the wait signal 51 and raise the proceed signal 59 for the duration of the go-ahead signal detected at 54. Where the message had included an A this fact will have been detected at 107 to set an appropriate latch in control logic 56. The fact that this latch is set, combined with the second go-ahead detect signal, raises a signal on line 63, for example for operation of an automatic door lock 64.

In the illustrated embodiment, off-hook single shot 44 remains set for approximately 3.5 seconds. This is typically more than sufficient for one complete transaction as thus far described. Preferably the second signal from go-ahead detector 54 is employed to retrigger off-hook single shot 44 for an additional 3.5 seconds so that the extension line will be held briefly in condition to immediately service a subsequent transaction should one be initiated. This is frequently the case in an attendance recorder application where a series of users will be entering data in rapid succession. If such a subsequent data entry operation occurs within the time-out period of single shot 44, the EOM entered at the beginning of that transaction will provide another such signal to single shot 44 but there will be no need to wait for another go-ahead detect signal from detector 54 before transmitting the data to the central system since the extension remains active and the central system equipment (multifrequency receiver, etc.) servicing the same remains available.

Error conditions are detected both in the remote recorder unit and in the central system. For example, if a correct start of message sequence is not present, the SOM detector circuit 34 will not be activated. If a parity error occurs on any character, the latch in SOM circuit 34 will be reset to terminate the operation of the recorder. If the central system is not able to service the extension, single shot 44 will time out and reset the control logic 56, terminating the recorder operation. If no end-of-message character is received, the EOM detect circuit will not trigger the Control Logic to start the Sequencer (SEQ). Finally, if the central system refuses to accept the data (for example, if it finds upon checking the files that the identification number of the card read is not currently valid) no go-ahead signal will be received back from the central system and the off-hook single shot 44 will time out thereby resetting the terminal.

Figure 3:
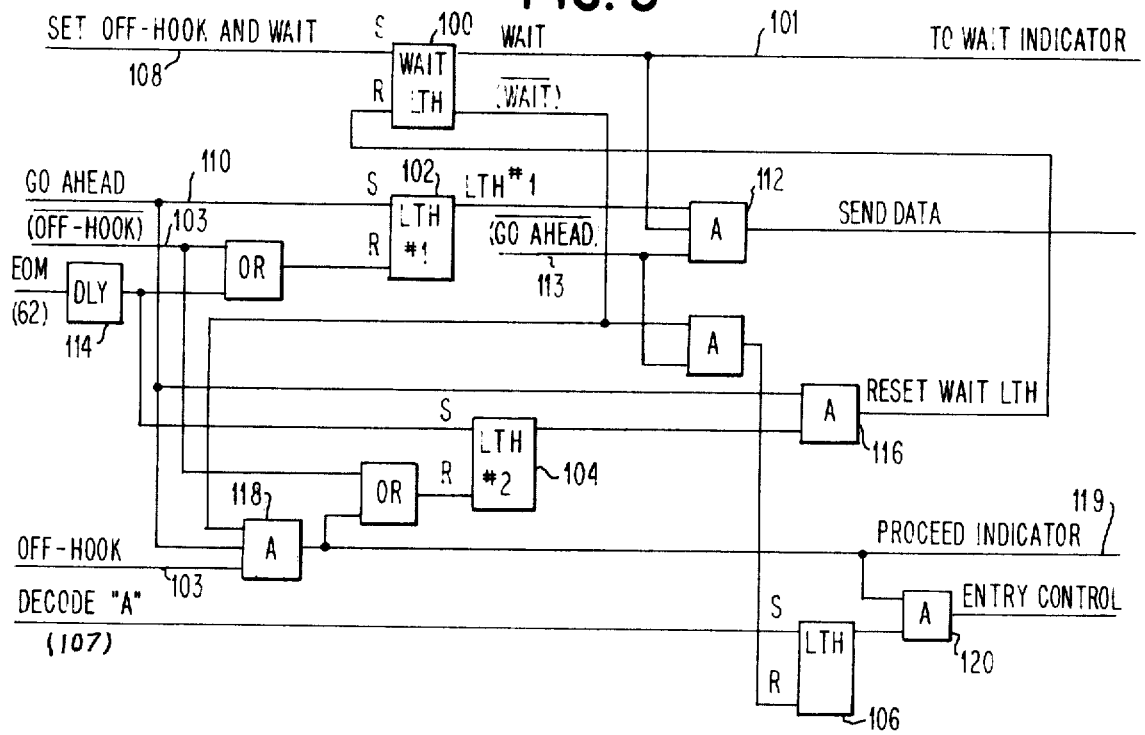
FIG. 3 is a logic diagram showing a portion of the control employed in the terminal of FIG. 1.

FIG. 3 shows a logic scheme suitable for implementation of control logic 56. In this implementation, latches 100, 102, 104 and 106 control a logical sequence of events to provide the operation aforedescribed. Latch 100 records a wait condition and provides an output 101 to the wait indicator 51. It is set by a signal on line 108 which is responsive to a signal on 52 from the EOM of FIG. 1. Wait latch also conditions AND circuit 112, indicating that good data has been read. Latch 102 records the fact that a go-ahead signal 110 has been received from go-ahead detector 54. There are two primary reasons for recording this event. One is that the send data command is responsive to the fall of the go-ahead signal. Thus, as shown in FIG. 3, AND circuit 112 provides, if it has been conditioned by wait latch 100, an output upon the occurrence of a not-go-ahead 113 (absence of go-ahead) output from go-ahead detector 54 following a go-ahead signal on that line, in other words, at the fall of go-ahead signal. Latch 102 is reset upon the occurrence of a not-off-hook signal on line 103 or, after a delay 114 of an EOM signal from detector 62, to terminate the send data signal. The delayed EOM signal from 114 also sets another control latch 104, the output of which is ANDed at 116 with the next go-ahead signal from 54 to reset wait latch 100. Thus the wait signal indicator is held on ON condition even after the message has been fully sent, until the go-ahead signal from detector 54 indicates that the control system 50 has accepted the message, or until single shot 44 times out. The resetting of wait latch 100 in conjunction with a go-ahead signal and an off-hook signal activates AND circuit 118 to bring up the proceed indicator line 119 and at the same time reset latch 104 and satisfy one leg of AND circuit 120. The other leg of AND circuit 120 is energized from the set output of latch 106. This latch records the presence of a hexidecimal A in the data transmitted to the central system, this fact having been detected at 107, FIG. 1, at the output of the buffer 16 as the message was transmitted. When the AND circuit 120 is satisfied, the entry control line 63 is activated.

If there is a subsequent transaction before offhook single shot 44 times out, latch 102 will be in set condition because, even though it was reset by a delayed EOM signal from the output of the buffer, it had been set again by the accept signal (second go-ahead) from detector 54. Accordingly, when signal is obtained from wait latch 100 which is set by operation of the EOM detector 41 at the output of shift register 14 upon the receipt of the second message, data can be sent immediately without a new go-ahead signal, latch 102 having already been set by the previous accept signal (i.e. the last go-ahead signal from detector 54).

Figure 4:
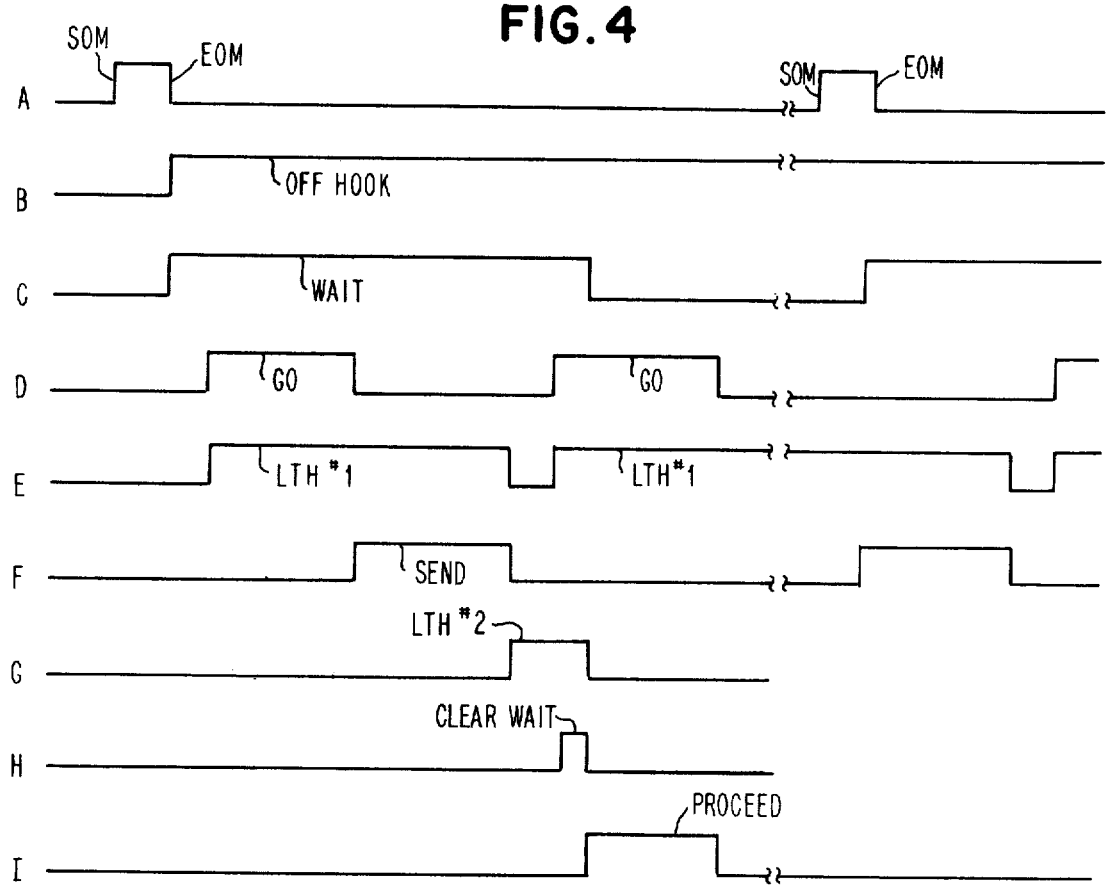
FIG. 4 is a timing diagram showing the relationship of various signals in the operation of the apparatus of FIGS. 1 and 3.

FIG. 4 summarizes the system operation. At the end of a good read, that is, at the occurrence of an EOM at the output of shift register 14, as shown in line A of the diagram, off-hook single shot is set, line B, and wait latch is set, line C. When the central system has responded to the off-hook signal (the closure of the extension line by relay 46) the central system provides a go-ahead signal, line D, which sets latch No. 1, line E. Send data line F is activated by the fall of go-ahead line D, and at the termination of sending data (as indicated by an EOM character being transmitted), latch No. 1 is reset (line E) and latch No. 2 is set (line G). The system, upon accepting the data, will respond with another go-ahead signal (line D) which turns on latch No. 1 (line E) and provides a clear wait signal (line H) which resets the wait latch (line C). Finally, Proceed signal on 119 (line I) is activated by AND 118.

While the invention has been particularly shown and described with reference to preferred embodiments thereof, it will be understood by those skilled in the art that various changes in form and detail may be made therein without departing from the spirit and scope of the invention.

What is claimed is:

1. In a data entry system, a bi-directional machine code reader and a document cooperative therewith, said document including a data stripe having code manifesting means readable by said reader in opposite directions, said stripe including start of message and data message codes in a first portion thereof followed by the mirror image of said data message codes and said start of message code in a second portion thereof, said second portion also including a control code unique to said second portion to distinguish said second portion from said first portion, said stripe including an end of message code between said data codes and the mirror image thereof to define the boundary between said portions of said stripe, said reader including start of message and end of message code detector means and storage means controlled thereby to store codes from whichever of said portions is encountered first by the reading of said stripe, decoder means responsive to said storage means to detect said control code if present in the codes stored therein, and means responsive to the detection of said control code by said decoder means to generate an output signal to an external device, said output signal being indicative that said stripe has been read from the end thereof bearing said second portion.

2. A system in accordance with claim 1, wherein said system is an entry-exit recorder system, and said external device is an automatic door lock operated by said output signal.

3. A system in accordance with claim 1, further including
a remote central station connected via an extension line to said reader,
means in said reader responsive to the reading and storing operations in said reader to communicate the stored information to said central station,
and logic means in said reader responsive to an answer message from said central station and to said output signal to operate said external device,
whereby local information derived from the direction of read of said document acts as a modifier to said answer message for operating said external device only when said document is read in a predetermined direction.

4. A system in accordance with claim 3 wherein said system is an entry-exit system, and said external device is a door lock operated by said output signal.

5. A system in accordance with claim 4 further including human sensible indicator means responsive to the storing of said information in said reader to provide a first sensible signal, and responsive to said answer message to provide a second sensible signal, whereby a person using said reader can be advised of the status of the operation of said system.

6. In combination,
an entry-exit recorder card reader having a through slot for receiving a card and adapted to permit the card to be moved through the slot selectively and independently in either of two directions,
a card shaped to be hand-held and while hand-held to be moved into, through and out of said slot selectively in either of two continuous motions from opposite directions,
said card including data indicia, machine readable in said opposite directions,
said indicia comprising at least two spacially related messages which differ from each other in content,
said card reader including input means located to be responsive to said indicia to read said indicia of both messages when said card is moved through said slot in either of said opposite directions,
said reader and said card including cooperative means responsive to the direction of motion of said card through said slot to accept one of said messages and reject the other, selectively in accordance with said direction of motion, and
said reader including further means responsive to said cooperative means to yield an external signal characterizing the entry/exit significance of data read from said indicia in accordance with said direction of motion, whereby said signal is indicative of the direction in which said card has been moved through said slot and is available to operate an associated device in coordination with operation of said reader.

7. The combination of claim 6, wherein
said card has a magnetic stripe comprising said indicia,
said card having a portion extending to one side of said stripe by which said card can be hand-held while the portion of said card bearing said stripe is moved through said slot in a position to be read by said reader.

8. A system in accordance with claim 7 wherein, said associated device is an automatic door lock.

* * * * *